Dec. 25, 1923. 1,478,839
A. A. SAMSON
BELT GUIDE AND SHIFTING MECHANISM
Filed Feb. 14, 1923
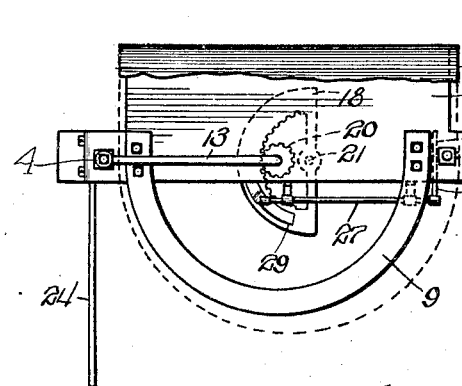
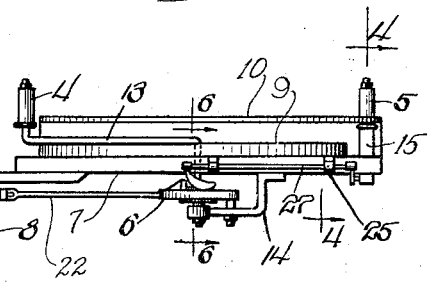
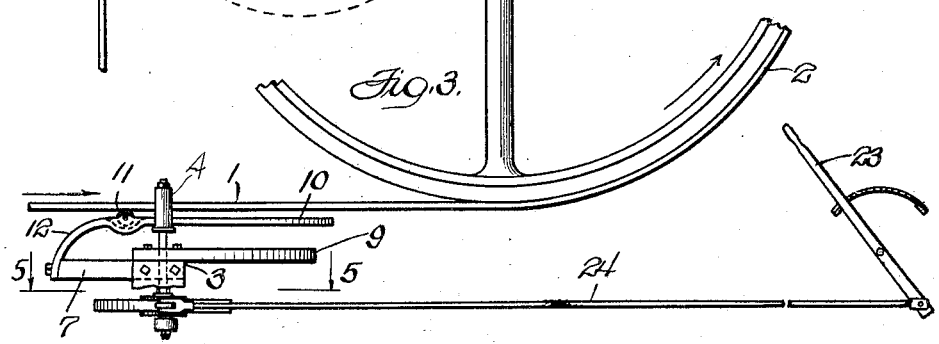
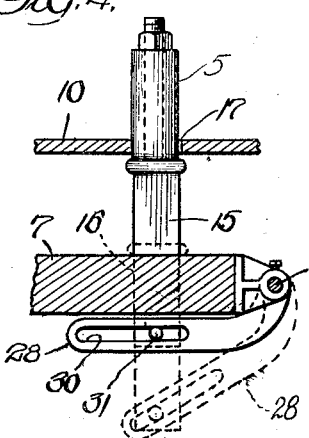
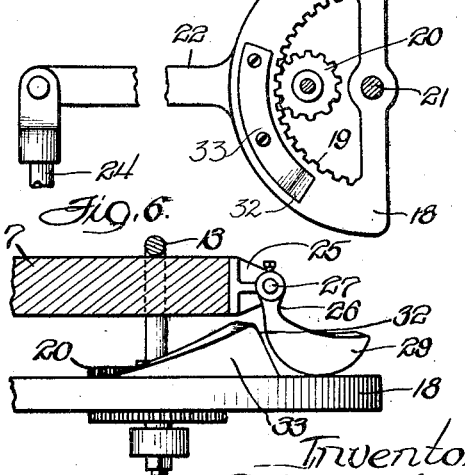
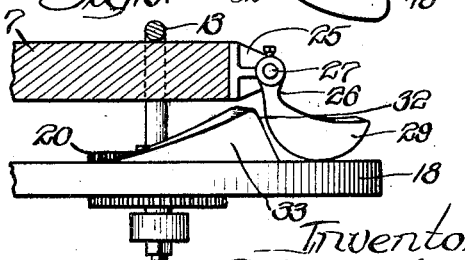

Patented Dec. 25, 1923.

1,478,839

UNITED STATES PATENT OFFICE.

ALFRED A. SAMSON, OF CHICAGO, ILLINOIS.

BELT GUIDE AND SHIFTING MECHANISM.

Application filed February 14, 1923. Serial No. 618,907.

*To all whom it may concern:*

Be it known that I, ALFRED A. SAMSON, a subject of the King of Great Britain, and a resident of Chicago, county of Cook, and State of Illinois, have invented a new and useful Improvement in Belt Guides and Shifting Mechanism, of which the following is a specification.

This invention relates to belt guides and shifting mechanisms.

The main objects of this invention are to provide an improved belt throwing device which normally acts as a belt guide; to provide a device of this kind involving the use of vertical idlers at opposite edges of the belt; and to provide improved means for retracting one of the idlers and for shifting the other when the belt is to be thrown.

An illustrative embodiment of this invention is shown in the accompanying drawings, wherein:

Figure 1 is a plan, partly broken away, of a combination belt guide and shifting mechanism to which this invention is applied.

Fig. 2 is a front elevation of the same.

Fig. 3 is a side elevation of the same, showing also part of a belt and pulley.

Fig. 4 is an enlarged fragmentary detail, partly in section, of one of the idlers, and showing also part of the mechanism by which it is shifted.

Fig. 5 is an enlarged plan of the gear mechanism for swinging the idler which throws the belt.

Fig. 6 is an enlarged detail, partly in section, showing part of the tripping mechanism for shifting the outside idler.

In the specific construction herein illustrated, the device involves the use of a pair of idlers arranged so as to be adapted to be located at opposite edges of a belt 1 for normally guiding the belt on the pulley 2. One of the idlers is shiftable across the path of the belt for throwing the latter from the pulley and the other idler is axially shiftable so that it may be retracted from its normal position to permit the removal of the belt. Improved mechanism is provided for actuating both idlers simultaneously.

The present invention may be applied to devices of this kind for use in throwing any endless belt, but in the construction shown, the device is particularly adapted for use in connection with engines used in driving farm implements, such as threshing machines and the like, wherein the driving belt has heretofore usually been thrown by hand at considerable risk of injury to the operator.

In the form shown, the device comprises a supporting frame 3, on which is mounted a pair of guide members in the form of idlers 4 and 5 arranged to normally guide a belt on the pulley and being shiftable into positions for throwing the belt by an improved form of operating mechanism 6.

In the construction illustrated, the frame 3 includes a substantially horizontal supporting plate 7 to which is secured a bracket 8 whereby the device may be mounted on any suitable support such as the side of the engine, not shown, which drives the pulley 2. Rigidly mounted on the plate 7, is a rearwardly projecting arcuate track arranged to slidably support the guide member 4 to permit said guide member to be swung in an arcuate path across the path of the belt for throwing the belt from the pulley. Located above the track 9, in spaced relation thereto is an apron 10 having journaled thereon a transversely disposed idler 11 arranged to support the running part of the belt so that if the belt becomes slack it will not be injured by coming into contact with the operating mechanism. The forward end of the apron 10 in advance of the idler 11 is curved downwardly to form a guard 12 and is rigidly secured to the supporting plate 7.

In the specific construction illustrated, the idlers 4 and 5 are disposed on vertical axes and are arranged on opposite sides of the device so as to be normally located at opposite edges of the belt. The idler 4 is loosely supported on the upper end of a crank 13 which is journaled at its other end in a bracket 14 mounted on the lower face of the supporting plate 7. The crank 13 slidably engages the arcuate track 9 so as to permit the idler 4 to be swung through an arcuate path across the path of the belt. The idler 5 is loosely mounted on the upper end of a square post 15, which is axially shiftable in a square opening 16 formed in the supporting plate 7. The idler 5 normally projects through an aperture 17 in the apron 10 so as to be located in position for guiding the outer edge of the belt, and is retracted to a position below the apron 10 by the operating mechanism 6, so as to permit the belt to be thrown from the pulley.

The operating mechanism 6, which actuates both idlers 4 and 5 simultaneously, includes a segment element 18 having an internal rack 19 meshing with a pinion 20 fixed on the lower end of the crank 13. The segment 18 is pivotally mounted on the bracket 14 by a pin 21 and has a radially projecting arm 22 which is secured to an operating lever 23 by a link 24, whereby the segment rack is oscillated for shifting the crank 13 which carries the idler 4.

Journaled in bearings 25 mounted on the supporting plate 7, is a crank 26 including a rod 27 to which is rigidly secured end members 28 and 29. The end member 28 has a slot 30 engaging a pin 31 on the lower end of the post 15 which projects downwardly through the supporting plate 7. The end member 29 is curved and rides on the upper face of the segment element 18 so as to coact with a shoulder 32 of a lug 33 mounted on the segment 18, whereby the rocking of the segment in one direction for shifting the idler 4 across the path of the belt will simultaneously rock the crank 26 so as to retract the idler 5. The end member 29 is of sufficient weight so as to normally rest on the face of the segment element 18 for holding the idler 5 in an elevated position.

In operation, the idlers 4 and 5 normally occupy the positions shown in Figure 2 so as to guide the belt on the pulley. To throw the belt, the operating lever 23 is shifted so as to rock segment 18, thereby simultaneously rocking the cranks 26 and 13 so as to retract the idler 5 and shift the idler 4 in an arcuate path across the path of the belt. To apply the belt to the pulley, the idler 4 is restored to its normal position as shown in Figure 2 by shifting the lever 23 to its initial position, and the idler 5 is manually retracted so as to permit the belt to be slipped around the pulley. When the belt has been placed around the pulley, the idler 5 is released from its manually retracted position.

Although but one specific embodiment of this invention has been herein shown and described, it will be understood that numerous details of the construction shown may be altered or omitted without departing from the spirit of this invention as defined by the following claims.

I claim:

1. A combination belt guide and shifting device comprising a pair of spaced guide members adapted for arrangement at opposite edges of a belt, mechanism for shifting one of said members across the path of the belt, and means for shifting the other of said members axially at substantially right angles to the plane of the belt.

2. A combination belt guide and shifting device comprising a pair of spaced guide members adapted for arrangement at opposite edges of a belt, mechanism for shifting one of said members across the path of the belt, and means for simultaneously shifting the other of said members axially at substantially right angles to the plane of the belt.

3. A combination belt guide and shifting device comprising a pair of spaced guide members adapted for arrangement at opposite edges of a belt, a pivotally supported arm carrying one of said members, a pinion on said arm, a rack coacting with said pinion for swinging said one member through an arcuate path across the path of the belt, and means for simultaneously shifting the other of said members axially at substantially right angles to the plane of the belt.

4. A combination belt guide and shifting device comprising a pair of spaced guide members adapted for arrangement at opposite edges of a belt, a support, an arm pivotally mounted on said support and carrying one of said members, a pinion on said arm, a rack coacting with said pinion for swinging said one member through an arcuate path across the path of the belt, a crank journaled on said support and having one end connected to the other of said members, and means for rotating said crank to shift said other member axially at substantially right angles to the normal plane of the belt.

5. A combination belt guide and shifting device comprising a pair of spaced guide members adapted for arrangement at opposite edges of a belt, a support, an arm pivotally mounted on said support and carrying one of said members, a pinion on said arm, a segment rack element coacting with said pinion for swinging said one member through an arcuate path across the path of the belt, a crank journaled on said support and having one end connected to the other of said members, and a shoulder on said rack element arranged to coact with the other end of said crank for shifting said other member axially.

6. A combination belt guide and shifting device comprising a pair of spaced upright idlers adapted for arrangement at opposite edges of a belt for guiding the belt on a pulley, a support, an arm pivotally mounted on said support and carrying one of said idlers, a pinion on said arm, a segment rack element pivoted on said support and coacting with said pinion for swinging said one idler through an arcuate horizontal path across the path of the belt, a crank journaled on said support and having a pin and slot connection with the other of said idlers, and a shoulder on said rack element arranged to coact with said crank for shifting said other idler axially downwardly to retract said other idler below the path of the belt.

7. A combination belt guide and shifting device comprising a pair of spaced guide members adapted for arrangement at opposite edges of a belt, an idler arranged between said members and adapted to support the running part of the belt, mechanism for shifting one of said members across the path of the belt, and means for shifting the other of said members axially at substantially right angles to the plane of the belt.

Signed at Chicago this 12 day of Feb. 1923.

ALFRED A. SAMSON.